April 25, 1950 H. C. SILENT 2,505,585
ELECTROACOUSTIC BINAURAL LISTENING SYSTEM
Filed Dec. 23, 1944
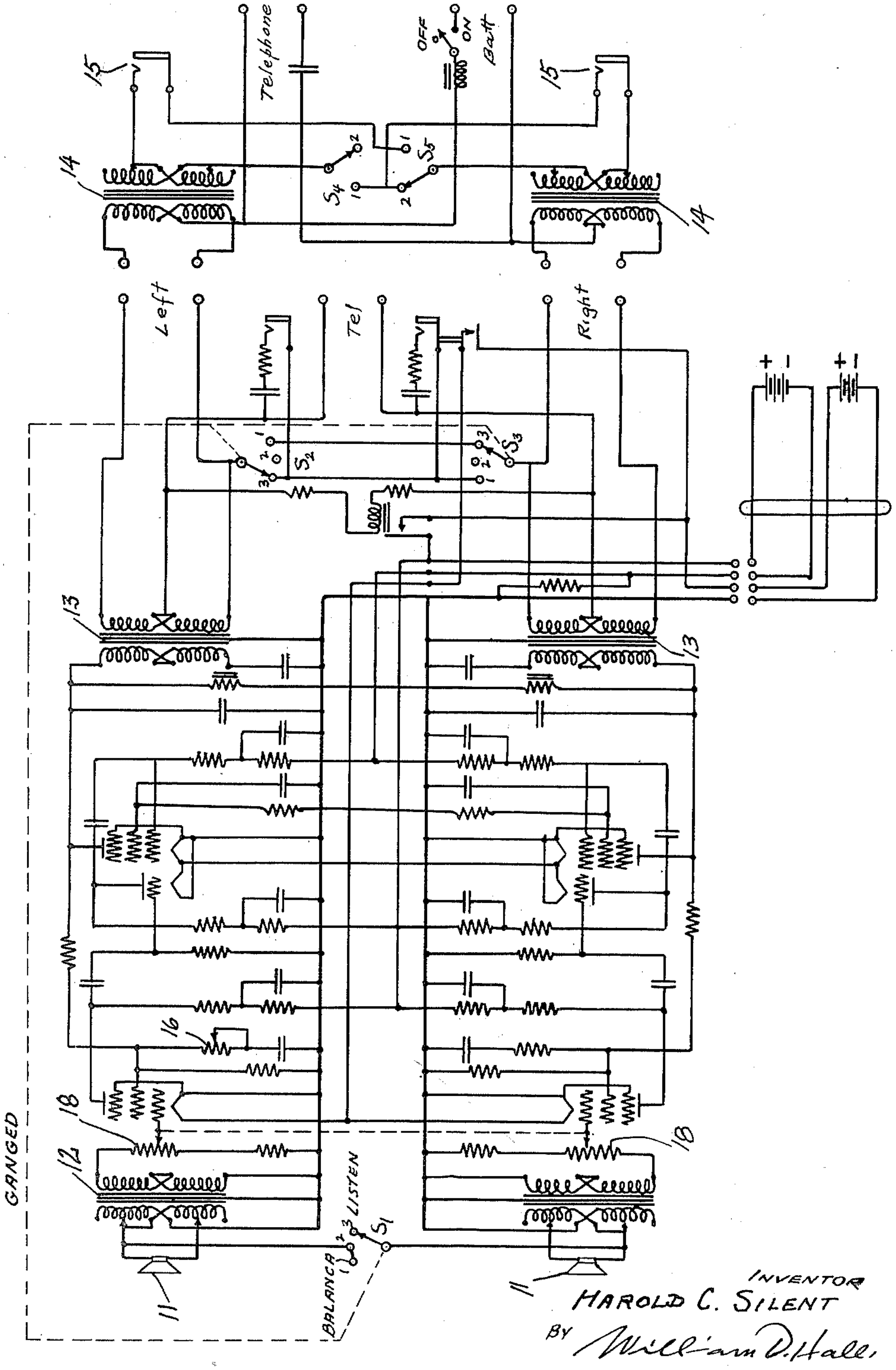
INVENTOR
HAROLD C. SILENT
BY William D. Hall
ATTORNEY Patented Apr. 25, 1950

2,505,585

UNITED STATES PATENT OFFICE 2,505,585

ELECTROACOUSTIC BINAURAL LISTENING SYSTEM

Harold C. Silent, Los Angeles, Calif., assignor to the United States of America as represented by the Secretary of War Application December 23, 1944, Serial No. 569,546

4 Claims. (Cl. 179—1)

The invention described herein may be manufactured and used by or for the Government for governmental purposes, without the payment of any royalty thereon.

This invention relates to improvements in electro-acoustic binaural listening systems.

A binaural listening system of the type herein considered comprises two transmission channels, each of which is composed of a sound pick-up or microphone, an amplifier, a wire transmission line, and a sound reproducer or receiver. The microphones of the two channels are mounted together so that their spacing with respect to each other is approximately that of the ears of a human. The receivers of the two channels are mounted as a pair of head receivers, individually connected to their corresponding channels. If the overall characteristics of the two channels are the same, they will pick up a sound with the same phase, intensity and arrival time relationship between them as would the human ears and transmit the sound to the receivers with the same relationships. The system enables the quality, the approximate direction and the character of sounds to be heard by a person located at some distance from the point at which actual listening is desired just as though the person were actually at the listening point. In such a system, however, besides matching the components of the two channels, in order to provide similar transmission characteristics, certain other requirements must be met.

It is therefore, an object of this invention to provide in a binaural listening system, means for matching the gains of the two channels to maintain the proper intensity difference between the signals in the two channels.

It is a further object to provide, in a binaural listening system, means for poling wire transmission lines to maintain the proper phase relationship between the signals in the two channels.

These and other objects are attained by the novel arrangements and circuits hereinafter described and illustrated in the accompanying drawings, forming a part hereof and in which the figure is a schematic diagram of the electrical circuits and apparatus in accordance with the invention.

Referring to the drawings, the binaural listening system is shown to comprise two similar channels, each of which has a listening microphone 11, a transformer 12 coupled to a three stage resistance coupled amplifier with degenerative feedback around all three stages. The output of the amplifier is connected through an impedance matching transformer 13 to a wire transmission line, which is terminated in an impedance matching transformer 14 connected to a head receiver 15.

One of the channels has variable resistance means 16 for adjusting the feedback voltage fed to the screen of the first vacuum tube to control the gain of that channel. The other channel has a fixed feedback. The output of both channels is controlled simultaneously by a dual potentiometer unit 18 in the grid circuit of the first tube. The amplifier output transformer 13, the wire line and the receiver impedance matching transformer 14 are phantomed to provide a circuit for telephonic communication between the two ends of the line and for remote control of the amplifier filament supply relay from a switch at the receivers.

By operating a three wafer, three position switch, $S_1$, $S_2$, $S_3$ to position 1, designated "balance" on the drawings, the inputs to the two amplifiers are connected in parallel and one-half of the output voltages of the two amplifiers, at the secondary of their output transformer, are connected together in series with a pair of head receivers so that the voltages oppose each other. Under this condition any sound picked up by the microphones will result in opposing voltages at the amplifier, and if the gains of the amplifiers are equal, the resultant voltage will be zero. Therefore, by listening on the head receivers to a sound being picked up by the microphones and adjusting the gain of one amplifier until a minimum of sound is heard, the equality of gain in the two channels is established.

It is desirable that means be provided for determining quickly and without auxiliary equipment that the lines connecting the outpost unit with the sound control unit have been correctly poled; that is, that no transposition has been introduced in the connection between these units which would have the effect of reversing the relative polarity of electrical impulses in the two channels, as received by the sound control unit with respect to the relative polarity of these transmitted from the output unit.

The poling of the wire transmission line is accomplished by means of the same wafer switch and a double-pole, double-throw toggle, $S_4$, $S_5$ switch at the receivers. With the wafer switch in position 2, designated "pole," and switch $S_4$, $S_5$ on position 1, designated "pole," the inputs to the two amplifiers are connected in parallel and the output voltages of the two receiver impedance matching transformers are connected together in series with a pair of head receivers so that the voltages oppose each other when the lines are poled properly. With this connection, providing the amplifier gains have been previously equalized, any sound picked up by the microphones will result in equal and opposing voltages at the receivers. Therefore, by listening on the head receivers to a sound being picked up by the microphones and reversing the connections of the two wires of one channel transmission line, the connection resulting in minimum sound in the receivers is the connection for proper poling of the transmission line.

When the wafer switch $S_1$, $S_2$, $S_3$, is turned to position 3, designated "listen" and the toggle switch $S_4$, $S_5$, is operated to "listen" the signals in the two channels are isolated from each other and the system is in condition for binaural listening.

From the above description it will be seen that there has been provided simple and effective means for properly equalizing the gains of amplifiers in the two channels of a binaural listening system.

The above description is to be considered as illustrative and not limitative of the invention, of which modifications can be made without departing from the scope of the appended claims.

I claim:

1. In a binaural listening system having two similar channels, each of said channels having a plurality-stage amplifier with degenerative feedback around all stages, a variable resistance in the feedback path of one of the channels to enable the varying of the gain of that channel without affecting the gain of the other channel, and a dual unit potentiometer to vary the gain of both channels simultaneously.

2. In a binaural listening system having two similar channels, each of said channels having a plurality-stage amplifier with degenerative feedback around all stages, a source of input signal for each channel, variable attenuator means in the feedback path of one of the channels to enable the varying of the amplification of the signal in that channel without affecting the amplification of the signal in the other channel, and a dual unit potentiometer to vary the amplification of the signals in both channels simultaneously.

3. In a binaural listening system having two similar channels, said channels including amplifiers, attenuator means for equalizing the signal amplification of said channels to maintain the original intensity relation of signals fed into each channel, and potentiometer means to vary the gain of the amplifiers in both channels simultaneously.

4. In a binaural listening system having two similar amplifying channels for signal inputs, each channel including resistive means for varying the gain of that channel without affecting the gain of the other channel for equalizing the gains of said channels whereby a fixed ratio is maintained between the signals in each channel, said means comprising a dual unit potentiometer for varying the gain of both channels simultaneously.

HAROLD C. SILENT.

REFERENCES CITED

The following references are of record in the file of this patent:

UNITED STATES PATENTS

| Number | Name | Date |
|---|---|---|
| 1,946,565 | Bauman | Feb. 23, 1934 |
| 2,093,540 | Blumlein | Sept. 21, 1937 |
| 2,098,561 | Beers | Nov. 9, 1937 |
| 2,126,929 | Snow et al. | Aug. 16, 1938 |